United States Patent
Penley et al.

(10) Patent No.: US 10,663,337 B2
(45) Date of Patent: May 26, 2020

(54) APPARATUS FOR CONTROLLING FLOW AND METHOD OF CALIBRATING SAME

(71) Applicant: Reno Technologies, Inc., Wilmington, DE (US)

(72) Inventors: Sean Penley, Sparks, NV (US); Michael Maeder, Reno, NV (US)

(73) Assignee: ICHOR SYSTEMS, INC., Fremont, CA (US)

( * ) Notice: Subject to any disclaimer, the term of this patent is extended or adjusted under 35 U.S.C. 154(b) by 333 days.

(21) Appl. No.: 15/858,689

(22) Filed: Dec. 29, 2017

(65) Prior Publication Data

US 2018/0188700 A1 Jul. 5, 2018

Related U.S. Application Data

(60) Provisional application No. 62/440,461, filed on Dec. 30, 2016.

(51) Int. Cl.
| | |
|---|---|
| *G01F 15/00* | (2006.01) |
| *G05B 13/02* | (2006.01) |
| *G01N 7/00* | (2006.01) |
| *G05D 7/06* | (2006.01) |
| *G01F 17/00* | (2006.01) |
| *G05D 7/00* | (2006.01) |

(Continued)

(52) U.S. Cl.
CPC .......... *G01F 15/002* (2013.01); *G01F 15/005* (2013.01); *G01F 17/00* (2013.01); *G01F 22/02* (2013.01); *G01F 25/0038* (2013.01); *G01F 25/0053* (2013.01); *G01N 7/00* (2013.01); *G05B 13/024* (2013.01); *G05D 7/005* (2013.01); *G05D 7/0186* (2013.01); *G05D 7/0623* (2013.01); *G01F 1/36* (2013.01)

(58) Field of Classification Search
CPC ............... G01F 15/002; G01F 25/0038; G01F 25/0053; G01F 17/00; G01F 15/005; G01F 22/02
See application file for complete search history.

(56) References Cited

U.S. PATENT DOCUMENTS

| | | | |
|---|---|---|---|
| 2,666,297 | A | 1/1954 | Skousgaard |
| 3,271,994 | A | 9/1966 | Fournier et al. |

(Continued)

FOREIGN PATENT DOCUMENTS

| | | |
|---|---|---|
| CN | 1816733 | 8/2006 |
| CN | 101178327 | 5/2008 |

(Continued)

*Primary Examiner* — Paul M. West
(74) *Attorney, Agent, or Firm* — The Belles Group, P.C.

(57) ABSTRACT

Apparatuses for controlling gas flow are important components for delivering process gases for semiconductor fabrication. In one embodiment, a method of calibrating an apparatus for controlling gas flow is disclosed. Specifically, the apparatus may be calibrated on installation using a two-step process of measuring the volume of gas box downstream from the apparatus by flowing nitrogen gas into the gas box and measuring the resulting temperature and rate of pressure rise. Using the computed volume of the gas box, a sweep of several mass flow rates may be performed using the process gas and the gas map for the process gas. The apparatus is calibrated based on the measured temperature and pressure values, which allow calculation of the actual mass flow rate for the process gas as compared with the commanded mass flow rates.

20 Claims, 7 Drawing Sheets

(51) Int. Cl.
  *G05D 7/01* (2006.01)
  *G01F 22/02* (2006.01)
  *G01F 25/00* (2006.01)
  *G01F 1/36* (2006.01)

(56) References Cited

U.S. PATENT DOCUMENTS

| | | |
|---|---|---|
| 3,335,748 A | 8/1967 | Klemm et al. |
| 3,453,861 A | 7/1969 | Levasseur |
| 3,491,946 A | 1/1970 | Muller |
| 3,504,692 A | 4/1970 | Goldstein |
| 3,559,482 A | 2/1971 | Baker et al. |
| 3,570,807 A | 3/1971 | Sturman et al. |
| 3,807,456 A | 4/1974 | Colletti |
| 3,814,541 A | 6/1974 | Dent et al. |
| 3,841,520 A | 10/1974 | Bryant et al. |
| 3,910,113 A | 10/1975 | Brown |
| 4,015,626 A | 4/1977 | Thordarson |
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,304,263 A | 12/1981 | Choate |
| 4,315,523 A | 2/1982 | Mahawili et al. |
| 4,327,757 A | 5/1982 | Weevers |
| 4,406,161 A | 9/1983 | Locke et al. |
| 4,462,915 A | 7/1984 | Friedman |
| 4,576,043 A | 3/1986 | Nguyen |
| 4,589,440 A | 5/1986 | Panet |
| 4,718,443 A | 1/1988 | Adney et al. |
| 4,741,359 A | 5/1988 | Siebald |
| 4,796,651 A | 1/1989 | Ginn et al. |
| 4,858,643 A | 8/1989 | Vavra et al. |
| 4,888,117 A | 12/1989 | Brown et al. |
| 4,904,285 A | 2/1990 | Yamada et al. |
| 4,918,995 A | 4/1990 | Pearman et al. |
| 5,003,810 A | 4/1991 | Jepson et al. |
| 5,044,199 A | 9/1991 | Drexel et al. |
| 5,052,363 A | 10/1991 | Stiles |
| 5,062,446 A | 11/1991 | Anderson |
| 5,080,131 A | 1/1992 | Ono et al. |
| 5,100,100 A | 3/1992 | Benson et al. |
| 5,100,551 A | 3/1992 | Pall et al. |
| 5,114,447 A | 5/1992 | Davis et al. |
| 5,123,439 A | 6/1992 | Powers |
| 5,129,418 A | 7/1992 | Shimomura et al. |
| 5,152,483 A | 10/1992 | Maeng |
| 5,159,951 A | 11/1992 | Ono et al. |
| 5,161,576 A | 11/1992 | Hekkert et al. |
| 5,187,771 A | 2/1993 | Uchida |
| 5,187,972 A | 2/1993 | Defriez |
| 5,190,068 A | 3/1993 | Philbin |
| 5,259,243 A | 11/1993 | Drexel et al. |
| 5,280,773 A | 1/1994 | Becker |
| 5,285,673 A | 2/1994 | Drexel et al. |
| 5,297,427 A | 3/1994 | Shambayati |
| 5,305,638 A | 4/1994 | Saghatchi et al. |
| 5,311,762 A | 5/1994 | Drexel |
| 5,321,992 A | 6/1994 | Mudd et al. |
| 5,325,705 A | 7/1994 | Tom |
| 5,329,966 A | 7/1994 | Fenimore et al. |
| 5,359,878 A | 11/1994 | Mudd |
| 5,419,133 A | 5/1995 | Schneider |
| 5,439,026 A | 8/1995 | Moriya et al. |
| 5,445,035 A | 8/1995 | Delajoud |
| 5,511,585 A | 4/1996 | Lee |
| 5,542,284 A | 8/1996 | Layzell et al. |
| 5,549,272 A | 8/1996 | Kautz |
| 5,583,282 A | 12/1996 | Tom |
| 5,624,409 A | 4/1997 | Seale |
| 5,660,207 A | 8/1997 | Mudd |
| 5,669,408 A | 9/1997 | Nishino et al. |
| 5,711,786 A | 1/1998 | Hinshaw |
| 5,730,181 A | 3/1998 | Doyle et al. |
| 5,762,086 A | 6/1998 | Ollivier |
| 5,804,717 A | 9/1998 | Lucas |
| 5,816,285 A | 10/1998 | Ohmi et al. |
| 5,865,205 A | 2/1999 | Wilmer |
| 5,868,159 A | 2/1999 | Loan et al. |
| 5,904,170 A | 5/1999 | Harvey et al. |
| 5,911,238 A | 6/1999 | Bump et al. |
| 5,917,066 A | 6/1999 | Eisenmann et al. |
| 5,918,616 A | 7/1999 | Sanfilippo et al. |
| 5,935,418 A | 8/1999 | Chakrabarty et al. |
| 5,944,048 A | 8/1999 | Bump et al. |
| 5,970,801 A | 10/1999 | Ciobanu et al. |
| 5,975,126 A | 11/1999 | Bump et al. |
| 5,988,211 A | 11/1999 | Cornell |
| 6,015,590 A | 1/2000 | Suntola |
| 6,026,834 A | 2/2000 | Azima |
| 6,026,847 A | 2/2000 | Reinicke et al. |
| 6,062,246 A | 5/2000 | Tanaka et al. |
| 6,062,256 A | 5/2000 | Miller et al. |
| 6,074,691 A | 6/2000 | Schmitt et al. |
| 6,080,219 A | 6/2000 | Jha et al. |
| 6,116,269 A | 9/2000 | Maxson |
| 6,119,710 A | 9/2000 | Brown |
| 6,125,869 A | 10/2000 | Horiuchi |
| 6,138,708 A | 10/2000 | Waldbusser |
| 6,152,162 A | 11/2000 | Balazy et al. |
| 6,178,995 B1 | 1/2001 | Ohmi et al. |
| 6,269,692 B1 | 8/2001 | Drexel et al. |
| 6,303,501 B1 | 10/2001 | Chen et al. |
| 6,314,991 B1 | 11/2001 | Gill |
| 6,332,348 B1 | 12/2001 | Yelverton et al. |
| 6,352,001 B1 | 3/2002 | Wickert et al. |
| 6,422,256 B1 | 7/2002 | Balazy et al. |
| 6,422,264 B2 | 7/2002 | Ohmi et al. |
| 6,425,281 B1 | 7/2002 | Sheriff et al. |
| 6,439,253 B1 | 8/2002 | Easton |
| 6,443,174 B2 | 9/2002 | Mudd |
| 6,539,968 B1 | 4/2003 | White et al. |
| 6,561,218 B2 | 5/2003 | Mudd |
| 6,564,825 B2 | 5/2003 | Lowery et al. |
| 6,631,334 B2 | 10/2003 | Grosshart |
| 6,655,408 B2 | 12/2003 | Linthorst |
| 6,712,084 B2 | 3/2004 | Shajii et al. |
| 6,752,166 B2 | 6/2004 | Lull et al. |
| 6,799,603 B1 | 10/2004 | Moore |
| 6,832,628 B2 | 12/2004 | Thordarson et al. |
| 6,868,862 B2 | 3/2005 | Shajii et al. |
| 6,881,263 B2 | 4/2005 | Lindfors et al. |
| 6,948,508 B2 | 9/2005 | Shajii et al. |
| 7,037,372 B2 | 5/2006 | Lindfors et al. |
| 7,073,392 B2 | 7/2006 | Lull et al. |
| 7,136,767 B2 | 11/2006 | Shajii et al. |
| 7,174,263 B2 | 2/2007 | Shajii et al. |
| 7,216,019 B2 | 5/2007 | Tinsley et al. |
| 7,252,032 B2 | 8/2007 | Scheffel et al. |
| 7,334,602 B2 | 2/2008 | Ahn |
| 7,337,805 B2 | 3/2008 | Brown et al. |
| 7,353,841 B2 | 4/2008 | Kono et al. |
| 7,370,664 B2 | 5/2008 | Glime |
| 7,424,346 B2 | 9/2008 | Shajii et al. |
| 7,431,045 B2 | 10/2008 | Mudd et al. |
| 7,474,968 B2 | 1/2009 | Ding et al. |
| 7,552,015 B2 | 6/2009 | Shajii et al. |
| 7,615,120 B2 | 11/2009 | Shajii et al. |
| 7,628,861 B2 | 12/2009 | Clark |
| 7,662,233 B2 | 2/2010 | Sneh |
| 7,680,399 B2 | 3/2010 | Buchanan et al. |
| 7,682,946 B2 | 3/2010 | Ma et al. |
| 7,693,606 B2 | 4/2010 | Ahmad et al. |
| 7,706,925 B2 | 4/2010 | Ding et al. |
| 7,717,061 B2 | 5/2010 | Ishizaka et al. |
| 7,757,554 B2 | 7/2010 | Ding et al. |
| 7,809,473 B2 | 10/2010 | Shajii et al. |
| 7,826,986 B2 | 11/2010 | McDonald |
| 7,850,779 B2 | 12/2010 | Ma et al. |
| 7,874,208 B2 | 1/2011 | Redemann et al. |
| 7,881,829 B2 | 2/2011 | Yoneda et al. |
| 7,891,228 B2 | 2/2011 | Ding et al. |
| 7,905,139 B2 | 3/2011 | Lull |

(56) References Cited

U.S. PATENT DOCUMENTS

| | | |
|---|---|---|
| 7,918,238 B2 | 4/2011 | Tanaka et al. |
| 7,922,150 B2 | 4/2011 | Cripps et al. |
| 7,974,544 B2 | 7/2011 | Kobayashi et al. |
| 7,979,165 B2 | 7/2011 | Gotoh et al. |
| 8,100,382 B2 | 1/2012 | Robertson, III et al. |
| 8,104,323 B2 | 1/2012 | Yasuda |
| 8,112,182 B2 | 2/2012 | Tokuhisa et al. |
| 8,183,781 B2 | 5/2012 | Lin et al. |
| 8,201,989 B2 | 6/2012 | Itoh et al. |
| 8,205,629 B2 | 6/2012 | Gregor et al. |
| 8,265,795 B2 | 9/2012 | Takahashi et al. |
| 8,282,992 B2 | 10/2012 | Myo et al. |
| 8,291,857 B2 | 10/2012 | Lam et al. |
| 8,293,015 B2 | 10/2012 | Lam et al. |
| 8,340,827 B2 | 12/2012 | Yun et al. |
| 8,343,258 B2 | 1/2013 | Guan |
| 8,343,279 B2 | 1/2013 | Myo et al. |
| 8,356,623 B2 | 1/2013 | Isobe et al. |
| 8,376,312 B2 | 2/2013 | Mudd et al. |
| 8,382,897 B2 | 2/2013 | Sangam |
| 8,408,245 B2 | 4/2013 | Feldman et al. |
| 8,443,649 B2 | 5/2013 | Yasuda et al. |
| 8,460,753 B2 | 6/2013 | Xiao et al. |
| 8,504,318 B2 | 8/2013 | Mendelson et al. |
| 8,505,478 B2 | 8/2013 | Suekane et al. |
| 8,511,337 B2 | 8/2013 | Nishimura |
| 8,573,247 B2 | 11/2013 | Ushigusa et al. |
| 8,744,784 B2 | 6/2014 | Yasuda et al. |
| 8,746,057 B2 | 6/2014 | Yasuda et al. |
| 8,770,215 B1 | 7/2014 | Mudd et al. |
| 8,789,556 B2 | 7/2014 | Yasuda et al. |
| 8,793,082 B2 | 7/2014 | Ding et al. |
| 8,800,589 B2 | 8/2014 | Minami et al. |
| 8,851,105 B2 | 10/2014 | Kashima et al. |
| 8,910,656 B2 | 12/2014 | Yasuda |
| 9,027,585 B2 | 5/2015 | Smirnov |
| 9,081,388 B2 | 7/2015 | Tanaka et al. |
| 9,188,989 B1 | 11/2015 | Mudd et al. |
| 9,207,139 B2 | 12/2015 | Jones et al. |
| 9,223,318 B2 | 12/2015 | Takeuchi et al. |
| 9,690,301 B2 | 6/2017 | Mudd et al. |
| 9,772,629 B2 | 9/2017 | Mohammed et al. |
| 9,778,083 B2 | 10/2017 | Spyropoulos et al. |
| 9,904,297 B2 | 2/2018 | Monkowski et al. |
| 2001/0013363 A1 | 8/2001 | Kitayama et al. |
| 2002/0002996 A1 | 1/2002 | Mudd |
| 2002/0014206 A1 | 2/2002 | Mudd |
| 2002/0046612 A1 | 4/2002 | Mudd |
| 2002/0095225 A1 | 7/2002 | Huang et al. |
| 2004/0007180 A1 | 1/2004 | Yamasaki et al. |
| 2004/0083807 A1 | 5/2004 | Mudd et al. |
| 2004/0261492 A1 | 12/2004 | Zarkar et al. |
| 2005/0056211 A1 | 3/2005 | Lindfors et al. |
| 2005/0087299 A1 | 4/2005 | Okabe et al. |
| 2005/0098906 A1 | 5/2005 | Satoh et al. |
| 2006/0005883 A1 | 1/2006 | Mudd et al. |
| 2006/0037644 A1 | 2/2006 | Nishikawa et al. |
| 2006/0060139 A1 | 3/2006 | Meneghini et al. |
| 2006/0124173 A1 | 6/2006 | An |
| 2006/0130755 A1 | 6/2006 | Clark |
| 2007/0089789 A1 | 4/2007 | Mudd et al. |
| 2007/0110636 A1 | 5/2007 | Lee et al. |
| 2007/0227659 A1 | 10/2007 | Iizuka |
| 2008/0035202 A1 | 2/2008 | Lee et al. |
| 2008/0041481 A1 | 2/2008 | Mudd et al. |
| 2008/0305014 A1 | 12/2008 | Honda |
| 2009/0101217 A1 | 4/2009 | Ushigusa et al. |
| 2010/0110399 A1 | 5/2010 | Lyons |
| 2010/0138051 A1 | 6/2010 | Glime |
| 2010/0224264 A1 | 9/2010 | Homan et al. |
| 2010/0269924 A1 | 10/2010 | Yasuda |
| 2011/0108126 A1 | 5/2011 | Monkowski et al. |
| 2012/0116596 A1 | 5/2012 | Yoneda et al. |
| 2012/0132291 A1 | 5/2012 | Monkowski et al. |
| 2012/0180876 A1 | 7/2012 | Hayashi et al. |
| 2012/0318383 A1 | 12/2012 | Yasuda et al. |
| 2013/0092256 A1 | 4/2013 | Yasuda et al. |
| 2013/0092258 A1 | 4/2013 | Yasuda et al. |
| 2013/0118596 A1 | 5/2013 | Horsky |
| 2013/0186499 A1 | 7/2013 | Yada et al. |
| 2014/0034164 A1 | 2/2014 | Yasuda |
| 2014/0069527 A1 | 3/2014 | Mudd et al. |
| 2014/0083514 A1 | 3/2014 | Ding |
| 2014/0158211 A1 | 6/2014 | Ding et al. |
| 2014/0190578 A1 | 7/2014 | Hayashi |
| 2014/0230915 A1 | 8/2014 | Mudd et al. |
| 2014/0260963 A1 | 9/2014 | Wang |
| 2015/0007897 A1 | 1/2015 | Valentine et al. |
| 2015/0027558 A1 | 1/2015 | Kehoe et al. |
| 2015/0121988 A1 | 5/2015 | Banares et al. |
| 2015/0212524 A1 | 7/2015 | Kehoe et al. |
| 2015/0362391 A1 | 12/2015 | Suzuki et al. |
| 2016/0011604 A1 | 1/2016 | Mudd et al. |
| 2016/0018828 A1 | 1/2016 | Mudd et al. |
| 2016/0041564 A1 | 2/2016 | Mudd et al. |
| 2016/0124439 A1 | 5/2016 | Yasuda et al. |

FOREIGN PATENT DOCUMENTS

| | | |
|---|---|---|
| CN | 102354228 | 2/2012 |
| CN | 103838261 | 6/2014 |
| DE | 69535683 | 1/2009 |
| EP | 0468793 | 1/1992 |
| EP | 0671484 | 9/1995 |
| EP | 0689040 | 12/1995 |
| GB | 2419421 | 4/2006 |
| JP | 11119835 | 4/1999 |
| JP | 2000018407 | 1/2000 |
| JP | 2004157719 | 6/2004 |
| JP | 3557087 | 8/2004 |
| JP | 2004302914 | 10/2004 |
| JP | 2007041870 | 2/2007 |
| JP | 4137666 | 8/2008 |
| JP | 4146746 | 9/2008 |
| JP | 2009079667 | 4/2009 |
| JP | 4351495 | 10/2009 |
| JP | 2009300403 | 12/2009 |
| JP | 4572139 | 10/2010 |
| JP | 4589846 | 12/2010 |
| JP | 4705140 | 6/2011 |
| JP | 2011171137 | 9/2011 |
| JP | 4974000 | 7/2012 |
| JP | 5090559 | 12/2012 |
| JP | 5091821 | 12/2012 |
| TW | 201414990 | 4/2014 |
| WO | WO8700267 | 1/1987 |
| WO | WO03081361 | 10/2003 |
| WO | WO200401516 | 12/2003 |
| WO | WO2011040409 | 4/2011 |
| WO | 2013049511 | 4/2013 |

APPARATUS FOR CONTROLLING FLOW AND METHOD OF CALIBRATING SAME

CROSS REFERENCE TO RELATED APPLICATIONS

The present application claims the benefit of U.S. Provisional Patent Application No. 62/440,461, filed Dec. 30, 2016, the entirety of which is incorporated herein by reference.

BACKGROUND OF THE INVENTION

Mass flow control has been one of the key technologies in semiconductor chip fabrication. Apparatuses for controlling mass flow are important for delivering known flow rates of process gases for semiconductor fabrication and other industrial processes. Such devices are used to measure and accurately control the flow of fluids for a variety of applications.

As the technology of chip fabrication has improved, so has the demand on the apparatuses for controlling flow. Semiconductor fabrication processes increasingly require increased performance, including more accurate measurements, lower equipment costs, improved transient response times, and more consistency in timing in the delivery of gases. Furthermore, as process complexity increases, process down time must be kept to a minimum to avoid lost production time.

SUMMARY OF THE INVENTION

The present technology is directed to a method of calibrating a pressure based apparatus for controlling flow and an apparatus for controlling flow which may be calibrated in accordance with the method.

In one embodiment, the invention is an in-situ method of calibrating a gas flow control apparatus for supply of a process gas. The gas flow control apparatus is pre-calibrated for a reference gas and is installed in a system for processing articles. The gas flow control apparatus then provides the reference gas to a gas box of the system at a predetermined flow rate while the gas box is sealed. The pressure within the gas box is measured as the reference gas is provided to the gas box. The volume of the gas box is then determined based on the measured rate of rise of pressure. The reference gas is then removed from the gas box, the gas box is sealed, and the process gas is provided to the gas box at a plurality of flow rates using the gas flow control apparatus. The pressure within the gas box is measured as the process gas is provided to the gas box and a gas map for the process gas based on the determined volume and the measured pressure.

In another embodiment, the invention is an in-situ method of calibrating a gas flow control apparatus for supply of a process gas. The gas flow apparatus is installed in a system for processing articles, the gas flow apparatus having a gas flow path extending from a gas inlet to a gas outlet, a valve in the gas flow path, a characterized flow restrictor in the gas flow path, and an apparatus controller having a memory. The reference gas is provided to the gas inlet of the gas flow control apparatus. The gas flow control apparatus flows the reference gas into a gas box of the system at a predetermined flow rate by opening the valve of the gas flow control apparatus. A pressure transducer measures the pressure within the gas box as the reference gas is provided to the gas box, the pressure transducer located downstream of both the valve and the characterized flow restrictor. The volume of the gas box is determined from the measured pressure from the pressure transducer. The reference gas is removed from the gas box and the valve of the gas flow control apparatus is closed. The process gas is provided to the gas inlet of the gas flow control apparatus and the gas flow control apparatus flows process gas into the gas box by opening the valve of the gas flow control apparatus. The pressure within the gas box is measured using the pressure transducer as the process gas is provided to the gas box. A gas map for the process gas is determined based on the determined volume and the measured pressure. Finally, the gas map is stored in the memory of the apparatus controller.

In yet another embodiment, the invention is a system for processing articles. The system has a gas flow control apparatus with a gas flow path extending from a gas inlet to a gas outlet, a valve in the gas flow path, a characterized flow restrictor in the gas flow path, a first pressure transducer, and an apparatus controller having a memory. The system further includes a gas box connected to the gas outlet of the gas flow control apparatus and a second pressure transducer operably coupled to the gas box downstream of the characterized flow restrictor. The gas flow control apparatus provides a reference gas to the gas box at a predetermined flow rate, measuring pressure within the gas box with the second pressure transducer, the measured pressure being used to determine the volume of the gas box. Subsequently, the gas flow control apparatus provides a process gas to the gas box, measuring pressure with the second pressure transducer. The determined volume of the gas box is used to calculate a gas map for the process gas and the gas map of the process gas is stored in the memory of the apparatus controller.

In another embodiment, the invention is an in-situ method of calibrating a gas flow control apparatus for supply of a process gas. The gas flow control apparatus is installed in a system for processing articles. The gas flow control apparatus then provides the reference gas to a gas box of the system at a predetermined flow rate while the gas box is sealed. The pressure within the gas box is measured as the reference gas is provided to the gas box. The volume of the gas box is then determined based on the measured rate of rise of pressure. The reference gas is then removed from the gas box, the gas box is sealed, and the process gas is provided to the gas box at a plurality of flow rates using the gas flow control apparatus. The pressure within the gas box is measured as the process gas is provided to the gas box and a gas map for the process gas based on the determined volume and the measured pressure.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The invention of the present disclosure will become more fully understood from the detailed description and the accompanying drawings, wherein.

DETAILED DESCRIPTION

Figure 1:
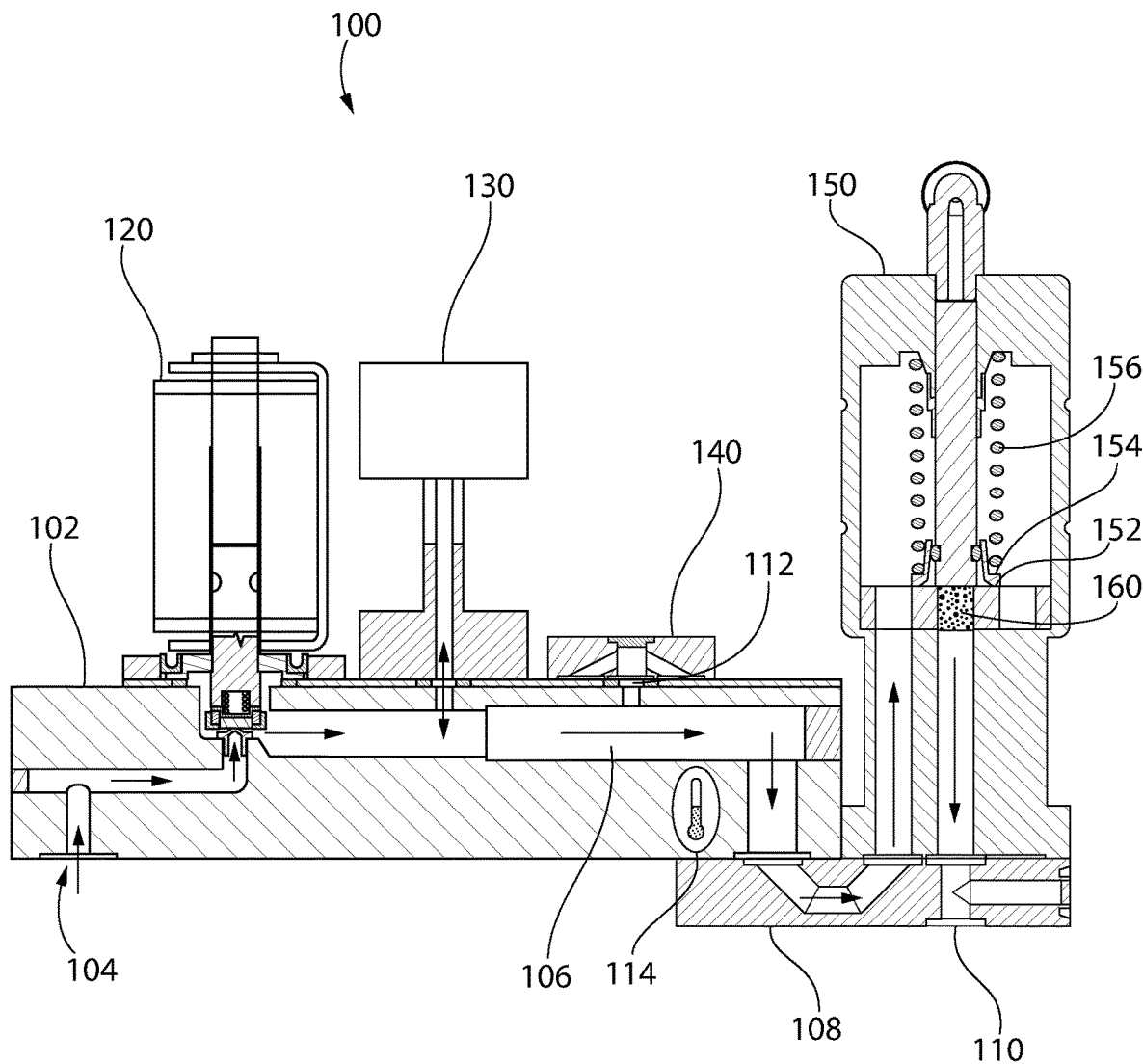
FIG. 1 is a cross sectional view of an apparatus for controlling gas flow.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The present invention is directed to a method of calibrating pressure based apparatuses for controlling mass flow. These apparatuses are used to provide steady state control of gas flows in a variety of industrial applications. Semiconductor fabrication is one industry which demands high performance in control of gas flows. As semiconductor fabrication techniques have advanced, customers have recognized the need to minimize equipment downtime through rapid calibration procedures. The need to improve flow rate accuracy, improve yield, and increase factory throughput all drive the need for improved calibration techniques. In particular, accurate calibration for hazardous gases is particularly challenging because it requires costly abatement systems, and generally must be either be done in a specialized facility with this capability, or be done on site with specialized equipment. Pre-install calibrations using estimated gas maps based on substitute gases do not yield satisfactory results.

FIG. 1 shows a cross sectional view of an apparatus for controlling flow 100. The flow path of the process gas is indicated by arrows which illustrate the path that the process gas takes through the apparatus 100. The apparatus 100 has a base 102 comprising an inlet 104 and an outlet 110. A supply of process gas is delivered to the inlet 104 of the base 102. The process gas then flows through a proportional valve 120 into a P1 volume 106 within the base 102. The proportional valve 120 meters the amount of process gas which passes to the P1 volume 106. The proportional valve 120 is capable of providing proportional control of the process gas such that it need not be fully open or closed, but instead may have intermediate states to permit control of the mass flow rate of process gas.

A P1 pressure transducer 130 is attached to the base 102 and is fluidly coupled to the P1 volume 106 so that it can sample the pressure within the P1 volume 106. The base 102 may incorporate one or more additional ports 112 to permit alternate configurations. In the present embodiment, the port 112 is blocked with a cap component 140. Alternate configurations may incorporate additional components or position the components differently to achieve different mass flow rates, or additional functions to further improve transient performance.

Next, the process gas flows out of the P1 volume 106 into an on/off valve 150. Internal to the on/off valve 150 is a valve seat 152 and a closure member 154. When the apparatus 100 is delivering process gas, the on/off valve 150 is in an open state, such that the valve seat 152 and the closure member 154 are not in contact. This permits flow of the process gas, and provides a negligible restriction to fluid flow. When the apparatus 100 is commanded to stop the flow of the process gas, the closure member 154 and the valve seat 152 are biased into contact by the spring 156, stopping the flow of process gas through the on/off valve 150.

Downstream of the valve seat 152 is a characterized flow restrictor 160 is typically introduced into the flow path to meter flow. The characterized flow restrictor 160 provides a known restriction to fluid flow. In yet other embodiments, the characterized flow restrictor 160 is located upstream of the on/off valve 150. The characterized flow restrictor 160 may be selected to have a specific flow impedance. This allows the apparatus 100 to supply different ranges of mass flow rates, depending on the desired application. The characterized flow restrictor 160 may be formed as a porous block, a device having small orifices or channels, or any other means of providing a restriction to process gas flow that is consistent and repeatable across a target dynamic operating range of mass flow rates. The characterized flow restrictor 160 has a greater resistance to flow than the passages upstream and downstream of the characterized flow restrictor 160. After passing through the characterized flow restrictor 160, the process gas exits the outlet 110. Generally, the outlet 110 of the apparatus 100 is coupled to a process header, the process header directing a plurality of process gases to a chamber in the process equipment where articles are processed. The process header and other equipment downstream of the apparatus 100 but upstream of the chamber are collectively referred to the gas box. The gas box will be discussed in further detail below.

Optionally, the apparatus 100 comprises a P2 pressure transducer downstream of the characterized flow restrictor 160 and the on/off valve 150. The P2 pressure transducer is used to measure the pressure differential across the characterized flow restrictor. In yet other embodiments, the P2 pressure may be obtained from another apparatus 100 connected to the process header, with the readings communicated to the first apparatus 100.

Optionally, temperature sensors may be employed to further enhance the accuracy of the apparatus 100. A temperature sensor 114 is shown in FIG. 1, located within the base 102 so that it can measure the temperature near the P1 volume 106. Additional temperature sensors 114 may be employed in a variety of locations, including the proportional valve 120, the pressure transducer 130, and the on/off valve 150. Furthermore, a pressure transducer downstream of the characterized flow restrictor 160 is utilized to implement the calibration method as will be discussed further below.

In yet other embodiments, the apparatus for controlling flow 100 may operate using a thermal method of measuring mass flow rates. Alternately, the components of the apparatus 100 may be rearranged in any manner required to implement the mass flow rate measurement and control function. The method of the present invention is not limited to the arrangement shown in FIG. 1.

Figure 2:
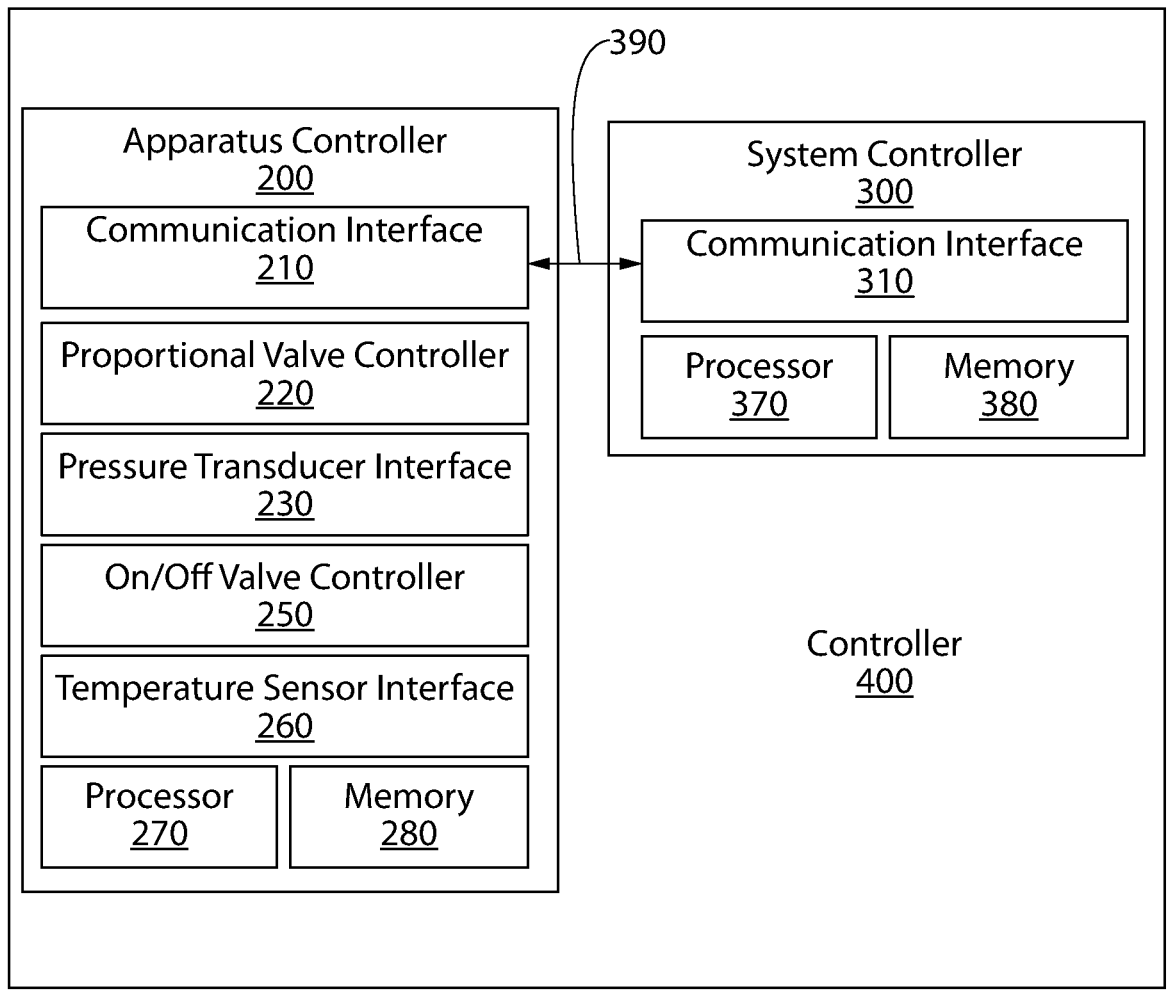
FIG. 2 is a block diagram illustrating the control system for the apparatus of FIG. 1.

Turning to FIG. 2, a block diagram illustrates the control system for the apparatus 100 of FIG. 1. This block diagram shows an apparatus controller 200 and a system controller 300. The apparatus controller 200 provides all control functions for the apparatus 100. The apparatus controller 200 has a communication interface 210, a proportional valve controller 220, a pressure transducer interface 230, an on/off valve controller 250, a temperature sensor interface 260, a processor 270, and memory 280. The communication interface 210 is configured to provide a communications link between the apparatus controller 200 and the system controller 300. Optionally, the temperature sensor interface 260 may be omitted if the additional accuracy provided by the temperature sensor 114 is not required.

The system controller 300 has a corresponding communication interface 310, a processor 370, and memory 380. The system controller 300 coordinates all high-level functions necessary to perform the desired process. The communication interface 310 of the system controller 300 sends and receives commands through a communications bus 390. The communications bus 390 connects to the communication interface 210 of the apparatus controller 210 of the apparatus 100. The communications bus 390 may connect to a single apparatus controller 200, or it may connect to a plurality of apparatus controllers 200, each apparatus controller 200 operating a distinct device. Not all apparatus controllers 200 need control an apparatus for controlling mass flow 100. Instead, other types of process equipment may also be controlled. Furthermore, there may be a plurality of communications buses 390 to connect all the devices required to perform the desired process.

In a typical calibration procedure, the apparatus 100 is calibrated for a process gas using a rate of rise ("RoR") system. Rate of rise systems can achieve high levels of accuracy by measuring the rate of pressure rise into a chamber of known volume. With accurately known volume, the temperature and pressure readings can be taken as the process gas is flowed into the chamber of known volume. This data is then used to determine the actual mass flow rate achieved as compared with the commanded mass flow rate. These numbers may be used to compute a gas map for the process gas which contains the necessary correction factors through the entire operating range of the apparatus 100. The gas map may take a variety of forms, but is used to accurately relate specific operating parameters of the apparatus 100 to each desired flow rate that the apparatus 100 may provide.

An apparatus 100 may either be calibrated at a facility dedicated to apparatus calibration or at the customer site. Each apparatus 100 must be calibrated for the process gas it will deliver. Some process gases are hazardous and require special handling. For instance, hazardous gases require an abatement system to avoid harm to workers and the environment. These systems typically cost in excess of $1 million and require many months to implement. When an abatement system is not available, a calibration facility may attempt to use a surrogate gas which is more benign than the process gas. A rough adjustment is required to account for differences between the process gas and the surrogate gas. This adjustment is generally crude due to the poor quality of available gas property data and the large number of unknowns associated with such estimated calibrations. Thus, actual rate of rise testing using the process gas with the apparatus 100 installed in-situ is far preferable. In the absence of an abatement system at the calibration facility, the calibration must be performed on site at the customer facility where the abatement system is already in place.

The rate of rise test may be performed on the customer's process equipment. However, this typically requires that additional hardware be installed to instrument the customer's equipment. Where hazardous gases are used, the system must undergo lengthy purge cycles to eliminate the hazardous gas before the necessary instruments can be installed. During purge cycles, the relevant portion of the system is generally pumped down to a high vacuum to remove all traces of the hazardous gas. After the test, these instruments are generally removed, requiring a further purge cycle. These purge cycles consume valuable operating time, creating a substantial burden on the customer when installing new equipment.

Figure 3:
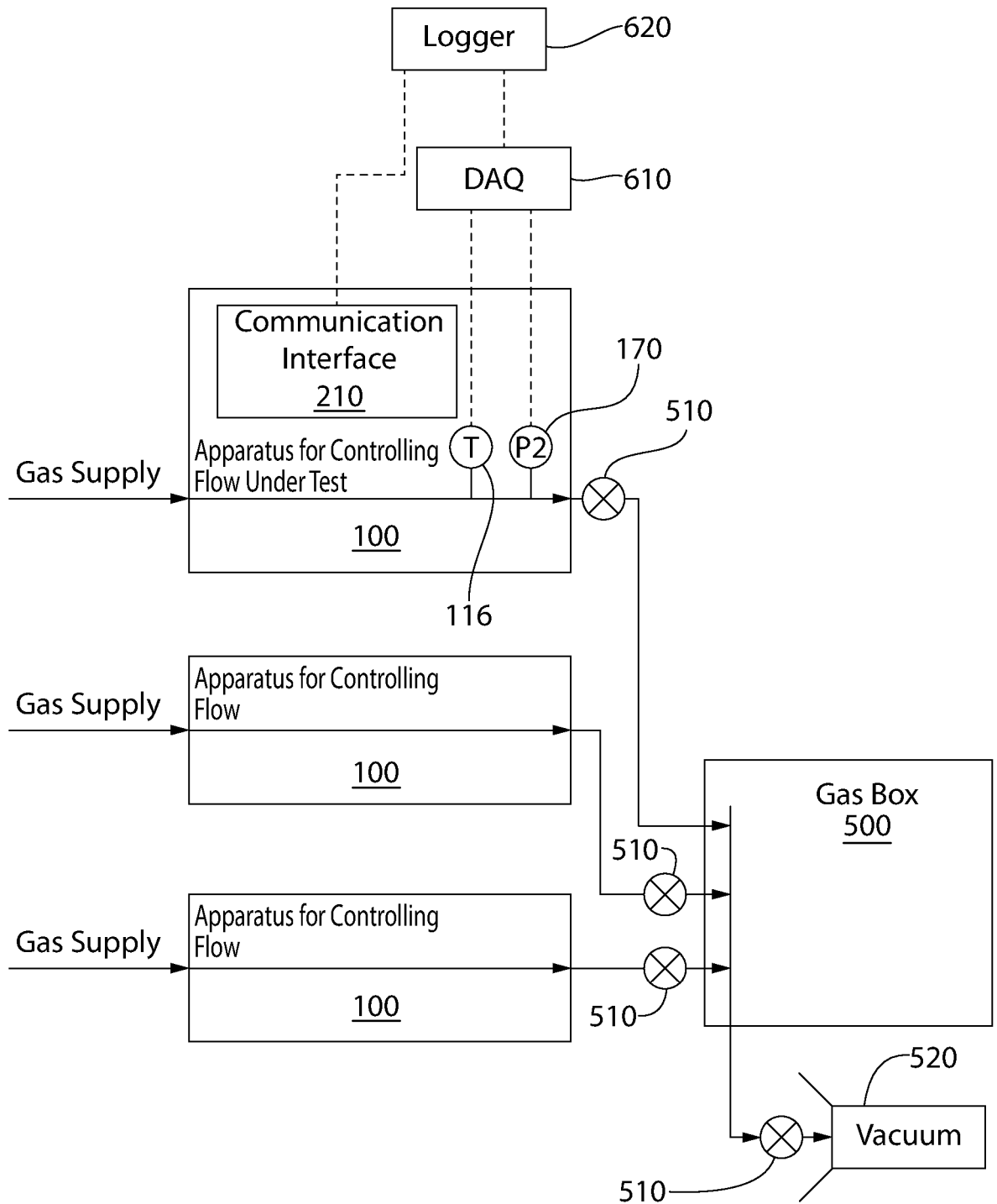
FIG. 3 is a schematic diagram of the apparatus of FIG. 1 according to a first embodiment of the method.

In order to reduce lost operating time and improve the resulting calibration, it is possible to utilize existing instrumentation in the customer's process equipment. This avoids the need to open fittings within the gas system. No purge cycles are required, so the total calibration time is dramatically reduced as compared with existing techniques. FIG. 3 shows one exemplary arrangement of the equipment used to calibrate the apparatus 100 is shown. The apparatus 100 is shown installed along with a plurality of other apparatuses 100. Once the apparatus 100 is installed, it becomes part of the system for processing articles. Each apparatus 100 is supplied with a gas supply, the gas supply being any desired process gas. In most implementations, the gas supplied to each apparatus 100 is different. However, in some embodiments, the same gas may be supplied to more than one apparatus 100. In yet other embodiments, mixtures of gases may be supplied to one or more of the apparatuses 100.

Each apparatus 100 is connected to a gas box 500 by an on/off valve 510. The apparatus 100 under test is instrumented with a temperature sensor 116 and a pressure transducer 170 which are incorporated into the apparatus 100. The pressure transducer 170 is located downstream of the characterized flow restrictor 160 and the on/off valve 150 and is directly coupled to the base 102 of the apparatus 100. In other embodiments, the temperature sensor 116 may be located downstream of the characterized flow restrictor 160 and the on/off valve 150, or it may be located anywhere that measures the temperature of the fluid within the gas box. This may include any portion of the base 102, including the portion upstream of the on/off valve 150 and the characterized flow restrictor 160. Alternately, the temperature sensor 116 may be coupled to a part of the gas box 500 downstream of the on/off valve 510. In the case of those embodiments where the temperature sensor 116 is coupled to a portion of the base 102 upstream of the on/off valve 150 and the characterized restrictor 160, the temperature sensor 116 is able to get an accurate reading of temperature as a result of the fact that the base 102 has a temperature which closely matches the temperature of the gas flowing through the apparatus 100.

Thus, the pressure and temperature of the gas flowing from the apparatus 100 currently under test into the gas box 500 may be measured. When the on/off valve 510 is open, the temperature and pressure readings taken by the temperature sensor 116 and the pressure transducer 170 are measurements of the actual temperature and pressure in the gas box 500. As is apparent, when the on/off valve 510 is closed, that apparatus 100 is isolated from the gas box 500. In some embodiments, the on/off valve 510 may be omitted or may be substituted for a proportional valve or other type of valve.

The output of the temperature sensor 116 and the pressure transducer 170 are measured by a data acquisition unit ("DAQ") 610 so that the pressure and temperature readings can be collected during the calibration process. A data logger 620 records the data acquired by the DAQ 610. The data logger 620 is also connected to the communication interface 210 of the apparatus 100 so that data logger 620 can be used to issue commands to the apparatus 100. Such commands may include a command to flow at a predetermined mass flow rate or to stop flowing gas.

Downstream of the gas box, an on/off valve 510 is arranged to vent to a vacuum source 520 which carries away process gases. In some embodiments, this vacuum source is also connected to the chamber where articles are processed. During normal operation of the system, the vacuum source 520 is used to purge the gas box 500 and the chamber between process steps. In some embodiments, the vacuum source 520 is also used during process steps.

Figure 4:
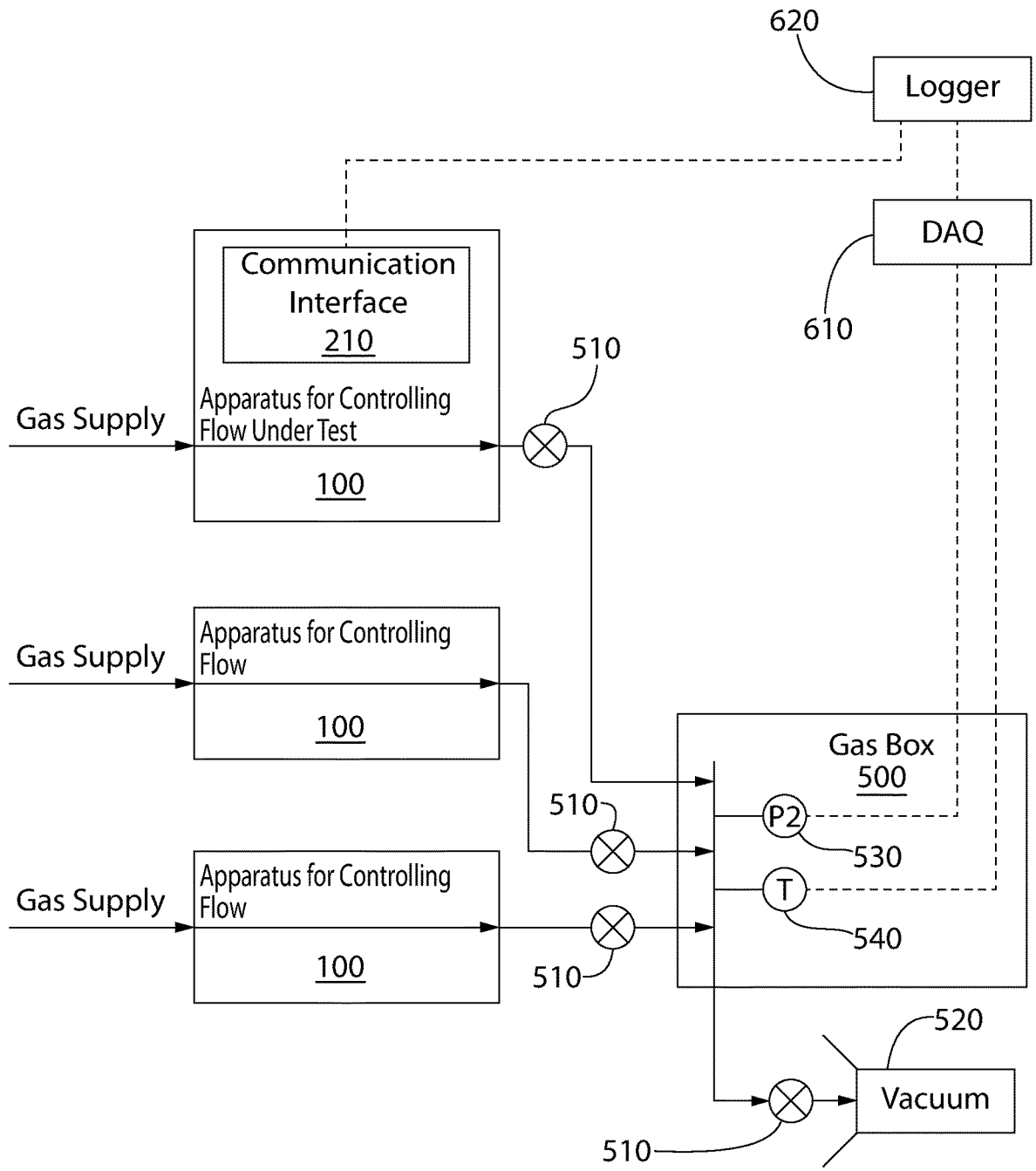
FIG. 4 is a schematic diagram of the apparatus of FIG. 1 according to a second embodiment of the method.

In an alternate configuration shown in FIG. 4, the communication interface 210 of the apparatus 100 remains connected to the data logger 620. However, the DAQ 610 is connected to a pressure transducer 530 and temperature sensor 540 which are located internal to the gas box 500. These may be permanently installed or may be installed to the gas box 500 only when calibration of one or more apparatuses 100 is required. In some embodiments, the temperature sensor 540 and pressure transducer 530 are attached by welding, soldering, a threaded connection, a flanged and bolted connection, or any other known means of coupling. The pressure transducer 530 and the temperature sensor 540 may be either permanently or detachably coupled to the gas box 500. Mounting the temperature sensor 540 and the pressure transducer 530 to the gas box 500 offers advantages of flexibility in the selection of sensors and does not require the use of integrated sensors already incorporated into one of the apparatuses 100. As noted previously, it is preferred that permanently installed sensors be used to avoid purge cycles, but even permanently installed sensors may be detachably coupled for future maintenance and replacement.

Figure 5:
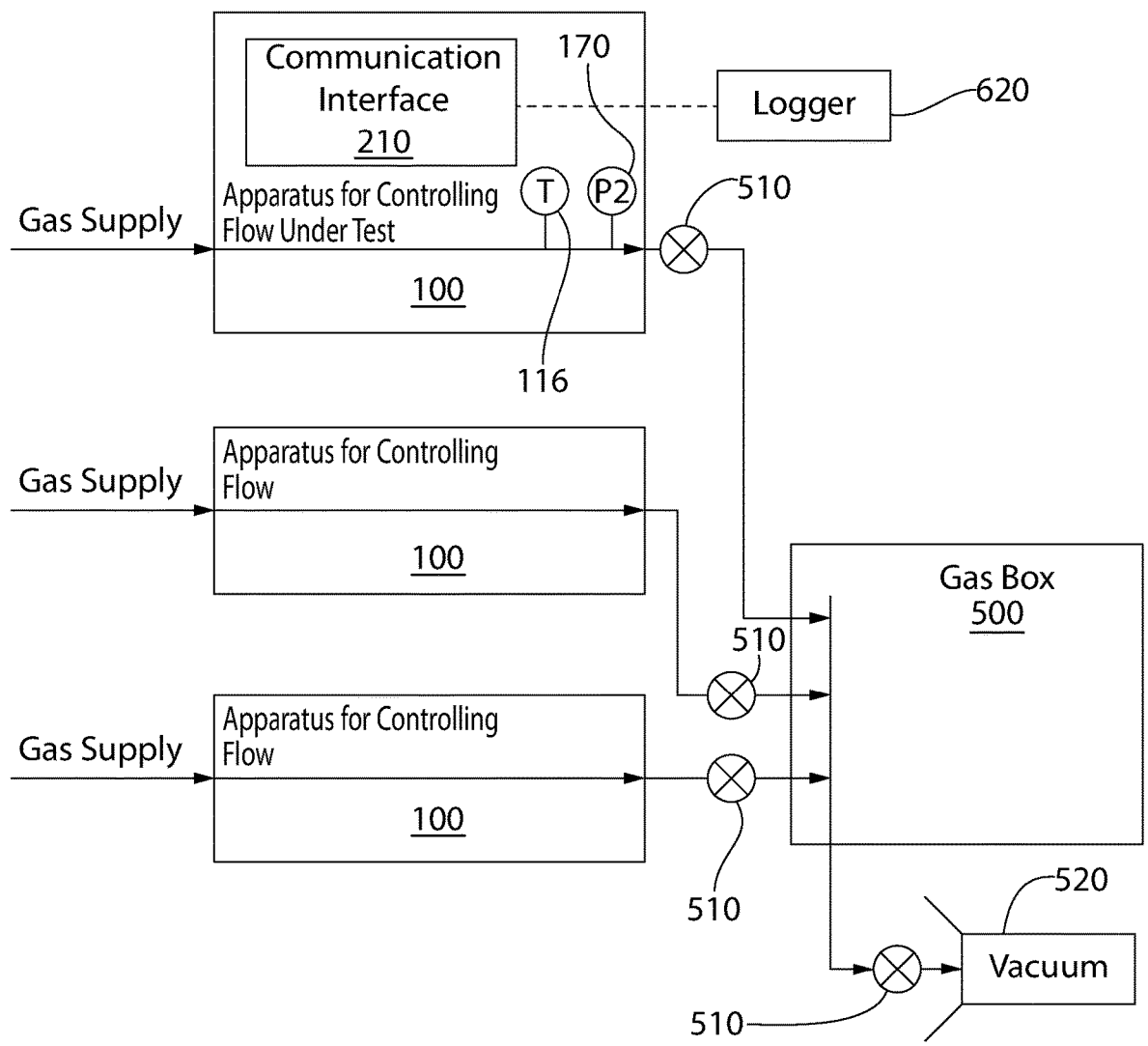
FIG. 5 is a schematic diagram of the apparatus of FIG. 1 according to a third embodiment of the method.

In a third configuration shown in FIG. 5, the data logger 620 is connected to the communication interface 210 of the apparatus, but no external DAQ 610 is required. In this embodiment, the calibration is initiated by instructions from the logger 620 to the apparatus 100. The apparatus 100 then uses the pressure transducer 170 and the temperature sensor 116 to implement the calibration procedure. This offers advantages of reduced system complexity, but requires the use of the sensors installed in the apparatus 100. Not all apparatuses 100 may utilize the needed sensors, so this arrangement may not be possible for certain devices.

In yet other configurations, the apparatus controller 200 may take readings directly from the pressure transducer 170. In some embodiments, the pressure transducer 170 and the P2 pressure transducer are the same device, permitting dual-purpose use of the pressure transducer 170 for both calibration and normal operation. In this embodiment, the temperature sensor 114 may also be used for temperature sensing. It is conceived that the apparatus controller 200 may perform the calibration procedure entirely automatically without the need for a data logger 620 or a DAQ 610.

Figure 6:
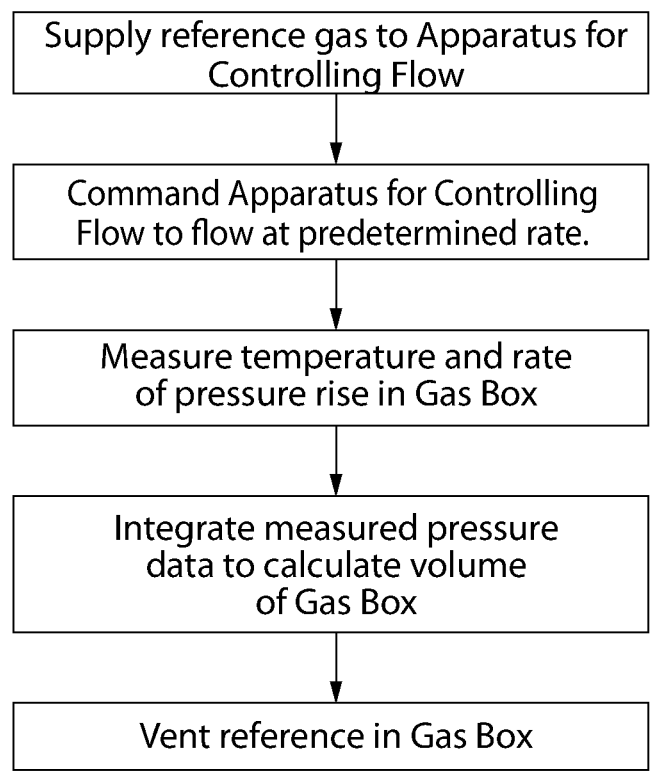
FIG. 6 is a flow chart illustrating a first step in the method according to FIGS. 3-5.

FIG. 6 shows the first step in the calibration procedure. The volume of the gas box 500 must be measured accurately so that it is known for the second step in the calibration procedure. Rather than attempt to calculate the volume of the gas box 500 downstream of the apparatus 100, it is possible to take a direct measurement using the apparatus 100 under test. This is accomplished by supplying a reference gas to the apparatus 100 under test. The apparatus 100 is pre-calibrated for the reference gas prior to installation in the system, so the mass flow rates of the reference gas are known with a high degree of accuracy. Nitrogen gas is commonly available and does not require any specialized abatement equipment, so it is a commonly used reference gas. The gas map for the reference gas is stored in the memory 280 of the apparatus controller 200, which provides a calibration specific to the reference gas across the operating range.

The reference gas is flowed through the apparatus 100 under test at a predetermined flow rate. The temperature and rate of pressure rise in the gas box 500 are measured for a period of time using the temperature sensor 116, 540 and the pressure transducer 170, 530. These measurements are then used to determine the volume of the gas box 500. Specifically, the mass flow rates are integrated over the period of time to determine the total mass flowed into the gas box 500. Finally, the reference gas in the gas box 500 is vented through the on/off valve 510 to the vacuum source 520. This allows an accurate determination of the volume of the gas box directly from measurement. There is no need to estimate the volume of the process header plumbing, the on/off valves 510, and any other equipment in the gas box 500. Furthermore, in the event that equipment is added or removed from the system and recalibration is required, this step can simply be repeated to determine a new volume of the gas box 500. Generally, this step is only repeated to verify the volume calculation, but further repetitions do not serve to enhance the accuracy of the measurement. Alternately, it is possible to flow the reference gas through the apparatus 100 at a predetermined pressure differential across the characterized restrictor 160. Once the gas map is known, the predetermined pressure differential may be used to determine the mass flow rate through the apparatus 100.

In some implementations it is possible to flow reference gas at more than one mass flow rate. This can be helpful in reducing the cycle time, but are not strictly required. In yet other implementations of the volume measurement step, it is possible to command the apparatus 100 under test to provide a fixed pressure in the P1 volume 106. This results in a non-linear mass flow rate as the pressure rises in the gas box 500. Any one of a variety of flow rate profiles may be used. For instance, the flow rate of the reference gas may be constant, linear, exponential, logarithmic, or parabolic. The flow rate need not be of increasing slope, but may start at a higher flow rate and decrease to a lower slope. Using a non-constant mass flow rate offers some advantages such as potential time savings, but the calculation of the volume of the gas box 500 is slightly more complicated.

In some embodiments, it is possible to install the apparatus 100 into the customer's process equipment pre-calibrated for a reference gas such as Nitrogen as noted above. In yet other embodiments, the measurements on the volume of the gas box 500 are performed prior to calibration of the apparatus 100 with the reference gas. The apparatus 100 may be subsequently removed and calibrated for the reference gas. The data collected during the volume measurement test may then be used, in combination with the gas map obtained from a subsequent calibration for the reference gas, to perform the volume calculation for the gas box 500. The calibration for the reference gas may be performed at any time, and does not impact the ultimate calibration obtained as long as the test conditions are known during the volume measurement step.

Exemplary reference gases include nitrogen, oxygen, carbon dioxide, carbon monoxide, argon, or helium. Exemplary process gases include nitrogen, oxygen, carbon dioxide, carbon monoxide, argon, helium, hydrogen, hydrogen bromide, hydrogen chloride, hydrogen fluoride, hydrogen sulfide, ammonia, nitric oxide, nitrous oxide, nitrogen trifluoride, chlorine, chlorine trifluoride, dichlorosilane, fluorine, sulfur hexafluoride, arsine, an arsenic compound, boron, a boron compound, germane, a germanium compound, phosphine, phosgene, a phosphorous compound, silane, or a silicon compound. Other reference and process gases may be used, depending on gas properties, local regulations on use and disposal, availability, and process requirements.

Figure 7:
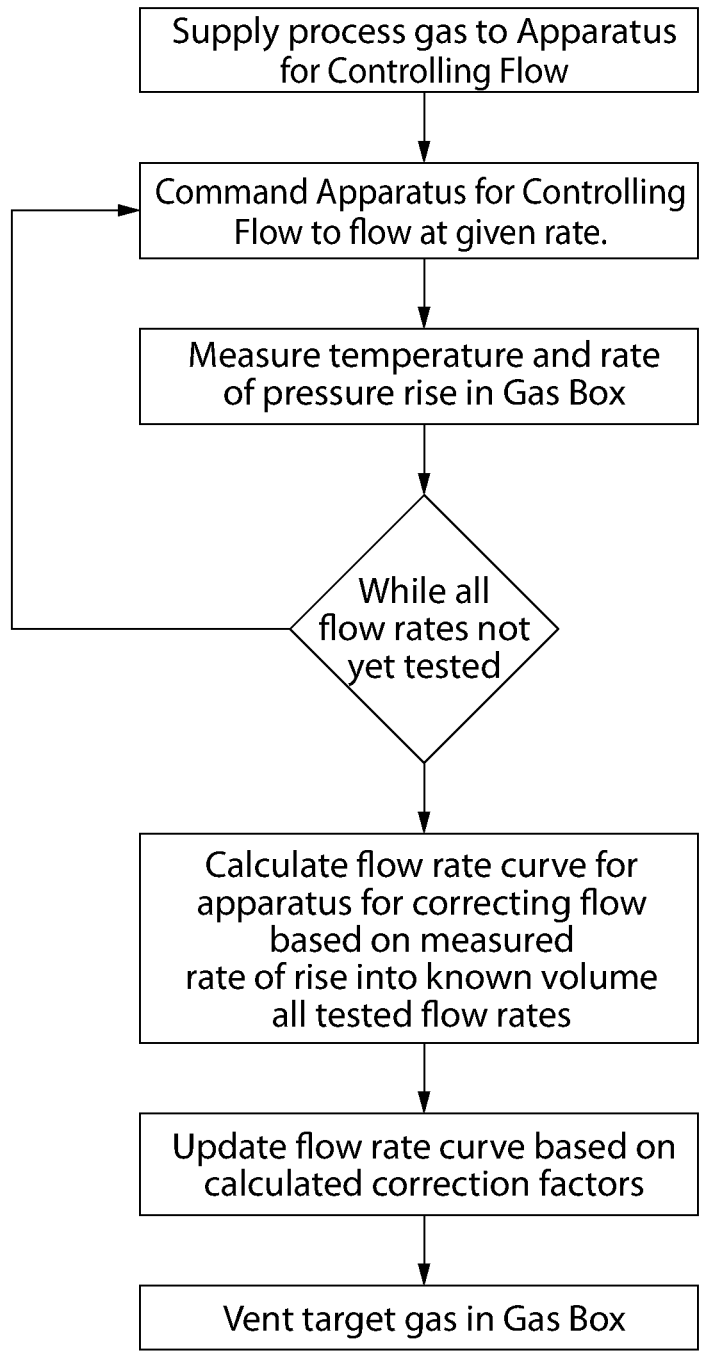
FIG. 7 is a flow chart illustrating a second step in the method according to FIGS. 3-5.

Once the volume of the gas box 500 has been accurately determined, the second step in the calibration procedure is implemented. This is generally referred to as a rate of rise (RoR) test and is illustrated in FIG. 7. The reference gas is removed from the apparatus 100 under test and replaced by the process gas. There is no need to purge the system because the portion of the system which must be opened does not contain any hazardous gases. It is possible to pump the gas box 500 down to a high vacuum, or it may simply be vented to reduce the pressure to a range closer to the anticipated operating range of the apparatus 100. Once the process gas is connected, the apparatus 100 is provided with an approximated gas map for the process gas. The apparatus 100 is then commanded to flow at a given mass flow rate. The temperature and the rate of rise of the pressure in the gas box 500 are measured for a period of time, with this data being collected at known intervals. The apparatus 100 can be commanded to flow at another mass flow rate and the temperature and the rate of pressure rise is measured again. This can be repeated for multiple desired mass flow rates within the operating range. Once the maximum pressure of interest is reached, valve 510 is opened, evacuating the downstream chamber to vacuum 520. Then valve 510 is closed and another rate of rise test ensues. Thus, a variety of mass flow rates may be tested in several rate of rise tests, sweeping the entire downstream pressure range of interest. Alternately, a plurality of desired mass flow rates may be tested during a single rate of rise test.

The rate of rise may also be performed by flowing gas at flow rates forming a linear curve, a parabolic curve, a logarithmic curve, or an exponential curve. The commanded flow rates may take any shape necessary to collect the required data on the full operating range of the apparatus 100. In other embodiments, the apparatus 100 is merely commanded to maintain a series of pressure differentials between the P1 volume and the gas box 500, rather than using an approximated gas map. Calibration may be performed without the need for an approximated gas map.

Once all rate of rise tests are complete, it is possible to use the known volume of the gas box 500 in combination with the measured temperature and pressure data for each commanded mass flow rate to compute a series of updated calibration values. The gas map for the process gas is then updated based on the computed calibration values. The gas box 500 is vented of the process gas and is ready for use. Optionally, the second step may be repeated one or more times to verify the accuracy of the gas map, or obtain higher fidelity by collecting data at different pressure ranges for the flow rates of interest.

In yet other embodiments, the rate of rise tests with the process gas may be performed prior to the volume measurement step. It is also possible that the calibration of the apparatus 100 with the reference gas may be performed subsequent to both the rate of rise tests and the volume measurement step. As noted previously, the data for computing the volume of the gas box 500 and the results of the rate of rise tests can be recorded. Calculation of the gas map for the process gas can be performed once all data has been obtained, but does not depend on the sequencing of the steps.

As noted previously, the embodiment of FIG. 3 utilizes the DAQ 610 and direct measurements of the temperature sensor 116 and pressure sensor 170 on the apparatus 100 under test. Preferably, the pressure sensor 170 can read accurately at relatively low pressures such as 0-50 kPa, 0-100 kPa, or 0-200 kPa. Although most apparatuses 100 for mass flow control must meet an over pressure requirement of 344 kPa (50 psi) or more, typical pressures in the gas box 500 do not exceed 50 kPa. Accordingly, there is no need to select a pressure sensor 170 capable of reading the full range. A sensor optimized for the expected range, not to exceed 200 kPa, is more desirable for providing an accurate gas map.

The DAQ 610 is able to read the values from the temperature sensor 116 and the pressure sensor 170 directly from the apparatus 100, rather than requiring that these values be transmitted by the communication interface 210. The communication interface 210 typically communicates via one or more communications buses 390. However, these communications buses 390 can suffer from high latency. In an effort to ensure consistent timing between samples, direct measurement of the sensors 116, 170 is preferred over data transmitted by the communications bus 390. However, both this implementation and the implementation of FIG. 4 require an external DAQ 610.

As noted previously, the implementation of FIG. 5 implements both the first and section steps of the calibration method in the apparatus controller 200. The logger 620 merely commands a step to begin, in combination with the desired parameters, and the apparatus controller 200 is capable of monitoring the temperature sensor 116 and the pressure sensor 170. The data is logged to the memory 280 while the apparatus controller 200 simultaneously causes the apparatus 100 to flow gas as required to perform each step of the calibration procedure. For instance, the instruction to begin the volume characterization step may be implemented merely with a command to begin, to flow at a given flow rate, and flow until the pressure in the gas box 500 is equal to 50 kPa. Thus, all functions of the rate of rise test may be performed by the apparatus controller 200 with minimal human intervention.

By implementing the steps in the apparatus controller 200, accurate timing of the measurements can be ensured. As with the implementation of FIGS. 3 and 4, there is no risk of latency on the communications bus 390 which might cause timing irregularities. However, the embodiment of FIG. 5 has the added advantage of reducing the amount of ancillary equipment required to perform the calibration. Optionally, the computation of the gas map for the process gas can also be performed internal to the apparatus controller 200 to further reduce the amount of data which may be transferred on the communications bus 390.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. An in-situ method of calibrating a gas flow control apparatus for supply of a process gas, the method comprising:
   a) installing the gas flow control apparatus in a system for processing articles, the gas flow apparatus being pre-calibrated for a reference gas;
   b) providing the reference gas to a gas box of the system at a predetermined flow rate using the gas flow control apparatus, the gas box being sealed;
   c) measuring pressure within the gas box as the reference gas is provided to the gas box;
   d) determining a volume of the gas box based on the measured pressure of step c);
   e) removing the reference gas from the gas box;
   f) providing the process gas to the gas box of the system at a plurality of flow rates using the gas flow control apparatus, the gas box being sealed;
   g) measuring pressure within the gas box as the process gas is provided to the gas box; and
   h) determining a gas map for the process gas based on the determined volume and the measured pressure of step g).

2. The method of claim 1 wherein the system for processing articles further comprises a vacuum valve and a vacuum source, the vacuum valve being opened to remove the reference gas from the gas box in step e).

3. The method of claim 1 wherein the gas flow control apparatus further comprises a valve and the system further comprises a pressure transducer, the pressure transducer operatively coupled to the gas box downstream of the valve of the gas flow control apparatus.

4. The method of claim 3 wherein the pressure transducer is mounted to the gas flow control apparatus.

5. The method of claim 3 wherein the pressure transducer is mounted to the gas box.

6. The method of claim 3 wherein the apparatus controller further comprises a pressure transducer interface and a communication interface, an output from the pressure transducer measured by the pressure transducer interface and communicated to a data logger by the communication interface.

7. The method of claim 3 wherein the system further comprises a second gas flow control apparatus, the pressure transducer mounted to the second gas flow control apparatus.

8. The method of claim 7 wherein the second gas flow control apparatus further comprises a second apparatus controller, the second apparatus controller further comprising a pressure transducer interface and a communication interface, an output from the pressure transducer measured by the pressure transducer interface and communicated to a data logger by the communication interface.

9. The method of claim 3 wherein an output from the pressure transducer is measured by a data acquisition unit and recorded by a data logger.

10. The method of claim 1 wherein the predetermined flow rate of the reference gas is constant, linear, exponential, logarithmic, or parabolic.

11. The method of claim 1 wherein the reference gas is one of nitrogen, oxygen, carbon dioxide, carbon monoxide, argon, or helium.

12. The method of claim 1 wherein the process gas comprises one of nitrogen, oxygen, carbon dioxide, carbon monoxide, argon, helium, hydrogen, hydrogen bromide, hydrogen chloride, hydrogen fluoride, hydrogen sulfide, ammonia, nitric oxide, nitrous oxide, nitrogen trifluoride, chlorine, chlorine trifluoride, dichlorosilane, fluorine, sulfur hexafluoride, arsine, an arsenic compound, boron, a boron compound, germane, a germanium compound, phospine, phosgene, a phospohorous compound, silane, or a silicon compound.

13. The method of claim 1 wherein the plurality of flow rates is a plurality of set points, a linear curve, a parabolic curve, a logarithmic curve, or an exponential curve.

14. An in-situ method of calibrating a gas flow control apparatus for supply of a process gas, the method comprising:
   a) installing the gas flow control apparatus in a system for processing articles, the gas flow apparatus comprising a gas flow path extending from a gas inlet to a gas outlet, a valve in the gas flow path, a characterized flow restrictor in the gas flow path, and an apparatus controller having a memory;
   b) providing a reference gas to the gas inlet of the gas flow control apparatus;
   c) causing the gas flow control apparatus to flow the reference gas into a gas box of the system at a predetermined flow rate by opening the valve of the gas flow control apparatus;
   d) using a pressure transducer to measure pressure within the gas box as the reference gas is provided to the gas box, the pressure transducer located downstream of both the valve and the characterized flow restrictor;
   e) determining volume of the gas box based on the measured pressure of step d);
   f) removing the reference gas from the gas box and closing the valve of the gas flow control apparatus;
   g) providing a process gas to the gas inlet of the gas flow control apparatus;
   h) causing the gas flow control apparatus to flow the process gas into the gas box by opening the valve of the gas flow control apparatus;
   i) measuring pressure within the gas box using the pressure transducer as the process gas is provided to the gas box;
   j) determining a gas map for the process gas based on the determined volume and the measured pressure of step i); and
   k) storing the gas map in the memory of the apparatus controller.

15. The method of claim 14 wherein the pressure transducer is mounted to the gas flow control apparatus.

16. The method of claim 14 wherein the pressure transducer is mounted to the gas box.

17. The method of claim 14 wherein the apparatus controller further comprises a pressure transducer interface and a communication interface, an output from the pressure transducer measured by the pressure transducer interface and communicated to a data logger by the communication interface.

18. The method of claim 14 wherein the system further comprises a second gas flow control apparatus, the pressure transducer mounted to the second gas flow control apparatus.

19. An in-situ method of calibrating a gas flow control apparatus for supply of a process gas, the method comprising:
  a. installing the gas flow control apparatus in a system for processing articles;
  b. providing a reference gas to a gas box of the system at a predetermined flow rate using the gas flow control apparatus, the gas box being sealed;
  c. measuring pressure within the gas box as the reference gas is provided to the gas box;
  d. determining a volume of the gas box based on the measured pressure of step c);
  e. removing the reference gas from the gas box;
  f. providing the process gas to the gas box of the system at a plurality of flow rates using the gas flow control apparatus, the gas box being sealed;
  g. measuring pressure within the gas box as the process gas is provided to the gas box; and
  h. determining a gas map for the process gas based on the determined volume and the measured pressure of step g).

20. The method of claim 19 wherein the gas flow control apparatus is calibrated for a reference gas subsequent to step c.

* * * * *